(12) United States Patent
Terris (10) Patent No.: US 9,751,135 B1
(45) Date of Patent: Sep. 5, 2017

(54) QUICK RELEASE HOLE SAW

(71) Applicant: Scott Terris, Jackson, WY (US)

(72) Inventor: Scott Terris, Jackson, WY (US)

(73) Assignee: Hole Dynamics, LLC, Jackson, WY (US)

( * ) Notice: Subject to any disclaimer, the term of this patent is extended or adjusted under 35 U.S.C. 154(b) by 0 days.

(21) Appl. No.: 15/482,545

(22) Filed: Apr. 7, 2017

Related U.S. Application Data (63) Continuation of application No. 15/399,534, filed on Jan. 5, 2017.

(60) Provisional application No. 62/419,345, filed on Nov. 8, 2016.

(51) Int. Cl.
*B23B 51/04* (2006.01)
*B23B 31/18* (2006.01)

(52) U.S. Cl.
CPC ........ *B23B 51/0473* (2013.01); *B23B 31/185* (2013.01); *B23B 51/04* (2013.01); *Y10T 279/1095* (2015.01); *Y10T 408/895* (2015.01)

(58) Field of Classification Search
CPC ..... B23B 51/04; B23B 51/0473; B23B 31/18; B23B 31/185; Y10T 408/895; Y10T 408/8957; Y10T 279/1095
See application file for complete search history.

(56) References Cited

U.S. PATENT DOCUMENTS

| | | | |
|---|---|---|---|
| 2,480,595 A * | 8/1949 | Moyer | B23B 51/0473 279/83 |
| 4,148,593 A | 4/1979 | Clark | |
| 5,027,684 A | 7/1991 | Neukam | |
| 5,108,235 A | 4/1992 | Czyzewski | |
| 5,352,071 A | 10/1994 | Cochran | |
| 6,926,476 B1 * | 8/2005 | Miyanaga | B23B 31/113 408/204 |
| 6,966,730 B1 * | 11/2005 | Miyanaga | B23B 31/1071 279/155 |
| 7,824,137 B2 | 11/2010 | Vasudeva et al. | |
| 7,959,371 B2 | 6/2011 | Keightley | |
| 8,048,078 B2 * | 11/2011 | Reinhard | A61B 17/162 279/24 |
| 8,100,612 B2 * | 1/2012 | Miyanaga | B23B 51/0426 408/204 |
| 9,120,162 B2 | 9/2015 | Keightley | |
| 9,248,513 B2 | 2/2016 | Lai | |

(Continued)

FOREIGN PATENT DOCUMENTS

| | | | |
|---|---|---|---|
| DE | 102006021715 A1 * | 11/2007 | ......... B23B 51/0413 |
| EP | 1447195 A1 * | 8/2004 | ......... B23B 51/0426 |
| FR | 951001 | 10/1949 | |

(Continued)

OTHER PUBLICATIONS

Lenox Snap-back Arbors Source: http://www.lenoxtools.com/pages/holesaw-snap-back-arbors.aspx, Date Accessed: Sep. 15, 2016.

(Continued)

*Primary Examiner* — Eric A Gates
(74) *Attorney, Agent, or Firm* — Durham Jones & Pinegar, P.C.; Christopher L. Wight (57) ABSTRACT

A hole saw assembly having a drive shaft, drive disk and hole saw blade. The drive disk has a plurality of radially extending projections that engage with engagement slots in the side of the hole saw blade.

17 Claims, 8 Drawing Sheets

(56) References Cited

U.S. PATENT DOCUMENTS

2007/0160434 A1    7/2007  Gillissen
2014/0126973 A1*  5/2014  Pamatmat ........... B23B 51/0473
                                                            408/240

FOREIGN PATENT DOCUMENTS

| FR | 951001 A | * | 10/1949 | ........... B23B 31/185 |
| JP | 02292107 A | * | 12/1990 | ............. B28D 1/041 |
| JP | 04075812 A | * | 3/1992 | ............. B28D 1/041 |
| JP | 04075813 A | * | 3/1992 | ........... B23B 31/113 |
| WO | 2016/072856 A1 | | 5/2016 | |

OTHER PUBLICATIONS

Bosch Introduces Universal Quick Change Hole Saw System Source: http://news.thomasnet.com/companystory/bosch-introduces-universal-quick-change-hole-saw-system-805168 Publication Date: Sep. 7, 2007 Date Accessed: Sep. 15, 2016.

* cited by examiner

QUICK RELEASE HOLE SAW

BACKGROUND

The present invention relates to arbors for use with a cylindrical hole saw. More specifically, the present invention relates to a hole saw arbor having a spring biased, quick release mechanism that releases a fully open cylindrical hole saw from the arbor.

Various general constructions of hole saw arbors and associated quick release drive collars, are well known in the field, as evidenced by the following representative patents: U.S. Pat. No. 5,108,235; U.S. Pat. No. 5,352,207; and U.S. Pat. No. 4,148,593. These representative patents disclose quick release hole saw assemblies in which the cylindrical hole saw has a back plate to which the hole saw arbor attaches. One disadvantage of the back plate is that when the hole saw is used to cut a cylindrical hole in a piece of wood, such as a door, the back plate interferes with access to the wood plug, which makes it more difficult for the operator to remove the wood plug from within the cylindrical blade.

Accordingly, there is a need to improve and simplify the process for removing the wood plug from within the cylindrical blade.

SUMMARY

The present invention relates to an improved hole saw assembly, which improves and simplifies the process for removing the wood plug from within the cylindrical blade. In particular, the present invention relates to a hole saw assembly in which the hole saw blade, when released from the hole saw arbor, has no back plate that interferes with the operator removing the wood plug from within the cylindrical blade, and is open or fully open at the proximal end of the hole saw blade to which the cylindrical hole saw is attached to the drive disk and the arbor shaft assembly.

In one aspect, the present invention relates to a quick release hole saw assembly, comprising: a cylindrical cutting blade consisting essentially of a cylindrical side wall having a fully open distal end having a cutting edge and a fully open proximal end having a plurality of engagement slots in the cylindrical side wall; a drive shaft configured to receive a guide drill; a drive disk non-rotateably connected to the drive shaft and configured to mate with the proximal end of the cylindrical side wall of the cylindrical cutting blade; and a plurality of projections attached to and extending radially outward from the drive disk and configured to reversibly engage with the plurality of engagement slots in the cylindrical side wall to transmit torque from the drive disk to the cylindrical cutting blade.

In one particular embodiment, the plurality of projections comprise drive latches configured to slideably and reversibly extend radially from the drive disk and engage with the engagement slots in the cylindrical side wall.

In another embodiment, the plurality of projections comprise drive latches configured to be pivotally mounted to a pivot point on the drive disk and to pivotally and reversibly extend radially from the drive disk and engage with the engagement slots in the cylindrical side wall.

In other embodiments, the plurality of drive latches comprise levers pivotally mounted on a pivot point to the drive disk.

In another embodiment each lever further comprises a second end with a latch configured to engage with a spring-actuated drive collar disposed about the drive shaft, wherein the spring actuated drive collar is biased to press the latch distally forward and pivotally cause the projection to engage with one of the plurality of apertures inside the cylindrical side wall.

In yet another embodiment, each lever is spring-actuated biased to pivotally cause the projection to engage with one of the plurality of apertures inside the cylindrical side wall.

In another embodiment, the plurality of apertures have internal side walls and the projections have external side walls, wherein the internal side walls of the plurality of apertures and external side walls of the projections have an angle of 90 degrees or less such that when torque is applied to the cylindrical cutting blade by the drive disk the projections are maintained in engagement with the apertures.

In another embodiment, the internal side walls of the plurality of apertures and external side walls of the projections have an angle of less than 90 degrees.

In another embodiment, the plurality of drive latches pivot into a radially extending channel in the drive disk when in engagement with the plurality of apertures, thereby providing side support for the drive latches when torque is applied to the drive disk.

In another embodiment, the first end of the plurality of drive latches pivots entirely into the channel.

In another embodiment, the spring-actuated drive collar has a channel inside the drive collar that engages a second end of the drive latch, wherein axial movement of the drive collar about the drive shaft away from the drive disk causes the drive latch to pivot and the first end of the drive latch to disengage from the cylindrical cutting blade apertures, thereby releasing the cylindrical cutting blade from the drive disk.

In another embodiment, the drive disk has a circumference less than the circumference of the inner surface of the cylindrical cutting blade.

In another embodiment, the fully open cylindrical cutting blade has no inwardly directed projections on the internal surface of the cutting blade that extend beyond the internal diameter of the cutting blade kerf.

In another embodiment, at least a portion of the open cam slots are at an angle sufficient to prevent release of the plurality of projections while the drive disk is transferring torque to the cylindrical saw blade.

In another aspect, the plurality of engagement slots in the cylindrical side wall comprise a threaded surface at the proximal end of the cylindrical cutting blade, and the plurality of projections attached to and extending radially outward from the drive disk comprise a mating threaded surface configured to reversibly thread onto the threaded surface at the proximal end of the cylindrical cutting blade. In one embodiment, the threaded surface at the proximal end of the cylindrical cutting blade and the mating threaded surface of the drive disk have a thread angle of greater than 20 degrees. In another embodiment, the threaded surface at the proximal end of the cylindrical cutting blade and the mating threaded surface of the drive disk have a thread angle of greater than 30 degrees.

These and other particular embodiments are described in greater detail in the drawings and detailed description of the invention, below.

DETAILED DESCRIPTION

The present invention relates generally to arbors for use with a cylindrical hole saw. A hole saw, also known as a hole cutter, is a saw blade of cylindrical or annular (ring) shape, whose annular kerf creates a hole in the work piece without having to cut up the core material. It is used in a drill. Hole saws typically have a pilot drill bit at their center to keep the saw teeth from walking. The fact that a hole saw creates the hole without needing to cut up the core often makes it preferable to twist drills or spade drills for relatively large holes (especially those larger than 25 millimeters (1.0 inch)). The same hole can be made faster and using less power.

The depth to which a hole saw can cut is limited by the depth of its cup-like shape or the length of the cylindrical saw blade. Most hole saws have a fairly short aspect ratio of diameter to depth, and they are used to cut through relatively thin work pieces, such as a door to create a hole for a door handle. However, longer aspect ratios are available for applications that warrant them.

The saw consists of a metal cylinder, usually steel, mounted on an arbor. The cutting edge either has saw teeth formed in it or industrial diamonds embedded in it. The arbor can carry a drill bit to bore a centering hole. After the first few millimeters of cut, the centering mechanism may no longer be needed, although it will help the bit to bore without wandering in a deep hole. The sloping slots in the cylinder wall help carry the dust out. The kerf of the cut is designed to be slightly larger than the diameter of the rest of the hole saw so that it does not get jammed in the hole.

Holes saws for use with portable drills are commonly available in diameters from 6 to 130 mm (0.24 to 5.12 in). The only limit on the length of the cylinder, and thus depth of the hole, is the need to remove the bit from the hole to clear dust. A 300 mm (12 in) cylinder length is not uncommon, although shorter bits are usual. By breaking the core off from time to time and using a shank extension, a diamond core drill can drill to depths many times its length. Saw teeth are used for most materials, such as wood, plastic, soft plaster, and metal. Diamond hole saws are used to bore holes in brick, concrete, glass, and stone.

The present invention provides a quick release hole saw assembly comprising a cylindrical cutting blade consisting essentially of a cylindrical side wall having a fully open distal end having a cutting edge and a fully open proximal end having a plurality of engagement slots in the cylindrical side wall. The hole saw assembly further comprises a drive shaft configured to receive a guide drill, and a drive disk non-rotateably (during operation) connected to the drive shaft and configured to mate with the proximal end of the cylindrical side wall of the cylindrical cutting blade, and a plurality of projections attached to and extending radially outward from the drive disk and configured to reversibly engage with the plurality of engagement slots in the cylindrical side wall to transmit torque from the drive disk to the cylindrical cutting blade.

As used herein, the terms "projection(s)" and "engagement slot(s)" means any suitable mechanical structure configured to engage the drive disk to the cylindrical cutting blade using projections and slots. For example, a projection may comprise a fixed pin, a reversible or retractable pin, or a threaded structure. Similarly, an engagement slot may comprise an aperture, a cam slot, a detent, depression, a mating threaded structure, or any other mechanical structure that may be suitable for reversibly connecting a fully open end of a cylindrical hole saw with a drive disk, to facilitate transmitting torque from the drive disk to the cylindrical saw blade.

As used herein, the terms "open" or "fully open", in reference to the proximal opening of the cylindrical saw blade that is attached to the drive disk, mean that the opening has no projections extending inwardly from the edge of the proximal end of the cylindrical saw blade. It is understood that in some embodiments, as shown in FIGS. 1-12, the proximal end of the cylindrical saw blade may be tapered to a smaller circumference relative to the distal end of the cylindrical saw blade having the saw teeth. In some embodiments, not expressly shown in the Figures, the proximal and distal ends of the cylindrical saw blade may be equal, thereby allowing removal of a wood plug from either the proximal or distal end of the cylindrical saw blade.

In one particular embodiment, the plurality of projections extending from the drive disk comprise drive latches configured to slideably and reversibly extend radially outward from the drive disk and engage with engagement slots, such as an aperture, in the cylindrical side wall.

In other embodiments, the plurality of projections comprise drive latches configured to be pivotally mounted to a pivot point on the drive disk and to pivotally and reversibly extend radially from the drive disk and engage with an engagement slot, such as an aperture, in the cylindrical side wall. The axis of the hinge or fulcrum point of the pivoting drive latches may be perpendicular to the axis of rotation of the hole saw assembly, as shown in the accompanying drawings, or may alternatively be parallel to the axis of rotation.

In some embodiments, the present invention relates to a hole saw arbor having a spring biased, quick release mechanism that releases a fully open cylindrical hole saw from the arbor.

For example, in one particular embodiment, the present invention relates to a quick release hole saw assembly, comprising a cylindrical cutting blade consisting essentially of a cylindrical side wall having a fully open distal end having a cutting edge and a fully open proximal end having a plurality of apertures in the cylindrical side wall; a drive shaft configured to receive a guide drill; a drive disk non-rotateably connected to the drive shaft and configured to mate with the proximal end of the cylindrical side wall of the cylindrical cutting blade; and a plurality of drive latches attached to and extending radially outward from the drive disk and having a projection at a first end configured to retractably or reversibly engage with the plurality of apertures from inside the cylindrical side wall and transmit torque from the drive disk to the cylindrical cutting blade. As used herein, the terms "distal end" and "proximal end" are used in reference to the point of view of a user who is operating a power drill to which the hole assembly is attached. Thus, the "distal end" means the end farthest away from the user, and the "proximal end" means the end closest to the user.

With respect to the plurality of drive latches, the hole saw assembly may include 2 or more drive latches. Smaller diameter hole saws may need only 2 drive latches, while larger diameter hole saws will ordinarily need 3 or more drive latches, in order to provide sufficient strength and durability, as well as stability of the hole saw during use.

Figure 3:
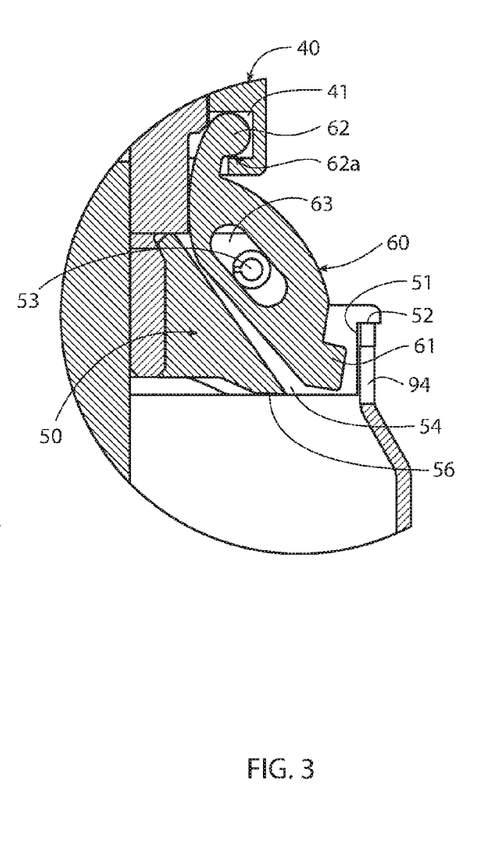
FIG. 3 is an enlarged section of FIG. 2.

The cylindrical cutting blade, when disengaged from the hole saw assembly (as shown in FIG. 3), has a fully open distal end having a cutting edge and a fully open proximal end. As used herein, the term "fully open" means that the ends have no back plate, rim or other projections outside of the external surface of the cylindrical side wall or outside the internal surface of the cylindrical side wall that would interfere with the core plug being removed from either end of the cylindrical saw blade. It is understood, of course, that the cutting edge of the cylindrical cutting blade will include saw teeth that are set to extend slightly outside the external surface of the cylindrical side wall and outside the internal surface of the cylindrical side wall, so as to cut away a width of material that is wider than the saw blade. The width of a saw cut is commonly referred to as the "kerf", which is desirably wider than the saw blade so as to allow for some slight space between the saw blade and the material being cut and preventing binding or jamming of the saw blade with the material while it is being cut. As used in reference to the cylindrical saw blade, the term "consisting essentially of" means that the cylindrical saw blade, when released from the drive disk, has no projections outside the external or internal wall surfaces, other than the blade teeth which may be set slightly wider, thereby leaving the distal end and proximal end of the cylindrical saw blade open so as to allow the core plug to be removed from either end, or easily pushed from either end of the cylindrical saw blade.

In other embodiments, the proximal end may have a diameter that is narrower than the distal end comprising the cutting end of the hole saw. In this embodiment, the proximal end to which the drive disk is connected remains open so as to permit removal of the core plug from the cylindrical saw blade by pushing the core plug from the open proximal end toward and out of the distal end. While this embodiment does not possess the advantage of being able to remove the core plug from either end, it retains the advantage of being able to push the core plug from the proximal end toward and out of the distal end with a user's finger.

It is also understood that the cylindrical saw blade may include other elements that do not interfere with the essential function of the fully-open distal and proximal ends of the saw blade. For example, the saw blade may include such additional features as holes or sloping slots in the cylindrical side wall to help carry the dust out. Since the holes do not create any structural element that extends outside the cylindrical side wall, they do not interfere with removal of the core plug from either end of the saw blade.

In some embodiments, the apertures in the cylindrical side wall of the cylindrical saw blade. The apertures may extend completely through the cylindrical side wall, or may extend only partially through the cylindrical side wall. Thus, as used herein, the term "aperture" includes a complete hole or opening the side wall, as well as holes extending only partially through the side wall.

In another aspect, the present invention contemplates a quick release hole saw assembly as described above, wherein the plurality of drive latches comprise levers pivotally mounted on a pivot point to the drive disk. The drive latches are configured so that when one end of the lever is pulled upwardly toward the guide drill attachment end of the arbor the other end of the lever will be pulled radially inward, specifically to disengage from the cylindrical saw blade apertures. The pivot point is desirably attached to the drive disk. The pivot point may be, for example, a small axle that extends through an aperture in the middle of the levers, thereby creating a pivot point about which the levers pivot.

Alternatively, in another aspect, the present invention contemplates a quick release hole saw assembly as described above, wherein the plurality of drive latches comprise a bar that slides in and out, so as to engage and disengage from the apertures in the cylindrical side wall.

In yet another aspect, the present invention contemplates a quick release hole saw assembly having such drive latches describe in the above paragraph, wherein each lever further comprises a second end with a latch configured to engage with a spring-actuated drive collar disposed about the drive shaft, wherein the spring actuated drive collar is biased to press the latch and pivotally cause the projection to engage with one of the plurality of apertures inside the cylindrical side wall. As shown in the drawings, the drive latches have a latch on one end that engages with the spring actuated drive collar. When the drive collar is moved upward, it pulls the end of the lever with the engaging latch upward, which causes the drive latch to pivot and the opposite end with the projection to retract radially inward. Similarly, when the drive collar is moved downward, it pushes the end of the lever with the engaging latch downward, which causes the drive latch to pivot and the opposite end with the projection to extend radially outward to engage with the apertures in the cylindrical saw blade. Thus, in one embodiment, each quick release hole saw assembly lever may be spring-actuated biased to pivotally cause the projection to engage with one of the plurality of apertures inside the cylindrical side wall.

Figure 4:
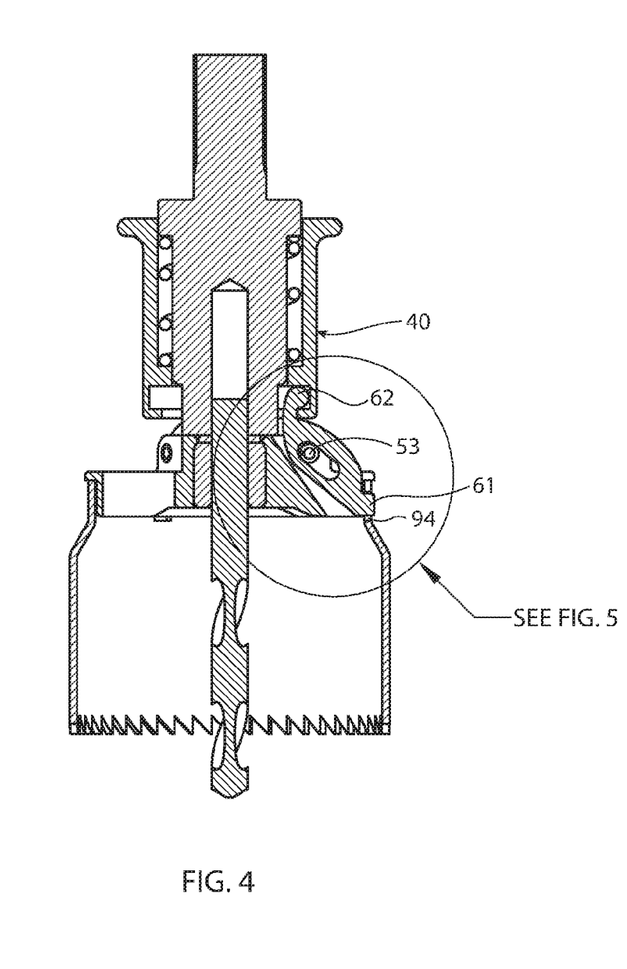
FIG. 4 is a side cutaway view of the hole saw assembly of FIG. 1, showing the hole saw blade disengaged with the assembly.

In yet another embodiment, the plurality of apertures have internal side walls and the projections have external side walls, wherein the internal side walls of the plurality of apertures and external side walls of the projections have an angle of 90 degrees or less such that when torque is applied to the cylindrical cutting blade by the drive disk the projections are maintained in engagement with the apertures. The angle of the internal side walls of the apertures that engage with the drive latch is relative to the inside surface of the cylindrical saw blade (i.e., forming an acute angle relative to the internal surface of the cylindrical saw blade, as shown in FIG. 4). The angle of the external side walls of the projections should generally correspond the matching internal side walls of the aperture that engage with the external side walls of the projections. In another embodiment, the internal side walls of the plurality of apertures and external side walls of the projections have an angle of less than 90 degrees.

In another aspect of the invention, the plurality of drive latches pivot into a radially extending channel in the drive disk when in engagement with the plurality of apertures, thereby providing side support for the drive latches when torque is applied to the drive disk. The channel within which the drive latches move and pivot is useful in that they provide additional support for the drive latches when they are engaged with and transferring torque to the cylindrical saw blade. In another embodiment, the first end of the plurality of drive latches having the projection pivots entirely into the channel, thereby providing improved support to the drive latch mechanisms when they are engaged with and transferring torque to the cylindrical saw blade.

In another embodiment, a quick release hole saw assembly is provided wherein the spring-actuated drive collar has a channel inside the drive collar that engages a second end of the drive latch, wherein axial movement of the drive collar about the drive shaft away from the drive disk causes the drive latch to pivot and the first end of the drive latch to disengage from the cylindrical cutting blade apertures, thereby releasing the cylindrical cutting blade from the drive disk.

In another aspect, the quick release hole saw assembly of the present invention may comprise a plurality of engagement slots in the cylindrical side wall that comprise open cam slots open at the proximal end of the cylindrical cutting blade, and the plurality of projections attached to and extending radially outward from the drive disk comprise fixed projections configured to reversibly slide into the open cam slots. The open cam slots are open from the proximal end of the cylindrical cutting blade so as to allow entry of the fixed projections extending from the sides of the drive disk as the drive disk is inserted into the proximal end of the cylindrical cutting blade. The open cam slots may have a detent in the side of the slot so that the projection may engage the detent when torque is transmitted from the drive disk to the cylindrical cutting blade. In some embodiments, the detent in the open cam slot may comprise an extension of the slot so that when the drive disk is pulled backward the projections engage with the extended slot and pull the cylindrical cutting blade from a working surface of hole that has just been drilled, without the drive disk and cylindrical cutting blade separating. In another embodiment, at least a portion of the open cam slots are at an angle sufficient to prevent release of the plurality of projections while the drive disk is transferring torque to the cylindrical saw blade.

In yet another embodiment, the plurality of engagement slots in the cylindrical side wall comprise a threaded surface at the proximal end of the cylindrical cutting blade, and the plurality of projections attached to and extending radially outward from the drive disk comprise a mating threaded surface configured to reversibly thread onto the threaded surface at the proximal end of the cylindrical cutting blade. The threads are oriented such that when the drive disk transmits torque to the cylindrical cutting blade, the threads on the cylindrical cutting blade and the threads on the drive disk engageably connect. In will be appreciated that with a threaded connection the drive disk transmitting torque to the cylindrical cutting blade, may cause the threads to tighten too much, preventing the cylindrical cutting blade from being unthreaded from the drive disk. In order to prevent such over-tightening of the threaded connection, the threaded surface at the proximal end of the cylindrical cutting blade and the mating threaded surface of the drive disk may have a thread angle that prevents over tightening. As used herein, the term "thread angle" means the angle of the direction of the threads relative to horizontal when the drive disk and cylindrical cutting blade are held in a vertical orientation (i.e., the surface being cut by the cylindrical cutting blade is horizontal). For example, in order to prevent overtightening of the threaded connection, the thread angle may be greater than 20, 25, 30, 35, 40, 45, 50, 55, 60, 65, 70, 75, 80 or 85 degrees. A higher thread angle will be less likely to result in overtightening when torque is transmitted from the drive disk to the cylindrical cutting blade.

One specific embodiment of the claimed invention is illustrated in FIGS. 1-7 of the drawings. The following describes this embodiment with reference to the Figures. The hole saw assembly comprises a cylindrical cutting blade 90 consisting essentially of a cylindrical side wall 91 having a fully open distal end 93 having a cutting edge 92 and a fully open proximal end 95 having a plurality of apertures 94 in the cylindrical side wall 91. The cylindrical side wall has an inner surface 96 and an outer surface 98. The proximal end may not be the same diameter as the distal end, provided that the proximal end is open sufficiently that a user can manually push a wood plug from the proximal end out of the distal end. In some embodiments, the proximal end may be larger in diameter than the distal end. In other embodiments, the proximal end may be smaller in diameter than the distal end. In some embodiments, the proximal end of the cylindrical cutting blade has an opening that is the same diameter as the inner surface 96 of the side wall at the most proximal point defining the proximal end of the cylindrical cutting blade.

Figure 1:
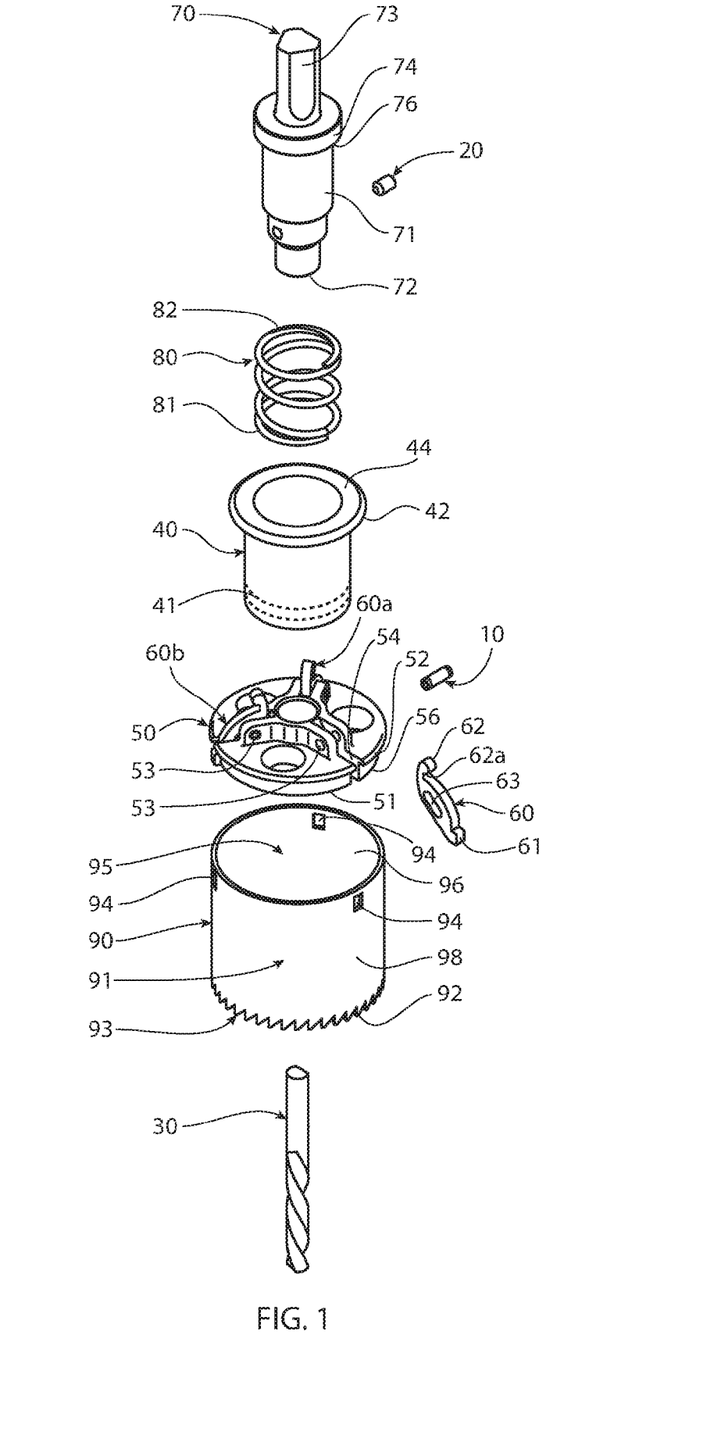
FIG. 1 is an exploded perspective view of one embodiment of a hole saw in accordance with the present invention.

The assembly further shows a drive shaft 70 configured to attached to a power drill at its proximal end 73 and receive and attach a guide drill 30 on its distal end. The assembly also shows a drive disk 50 that is non-rotateably connected to the drive shaft 70 and configured to mate with the proximal end 95 of the cylindrical side wall 91 of the cylindrical cutting blade 90. The figures also show a plurality of drive latches 60, 60a and 60b (shown in FIG. 1) attached to and extending radially outward from the drive disk 50. In FIG. 1 drive latch 60 is shown removed from the assembly, while drive latches 60a and 60b and having a projection 61 at a first end configured to retractably or reversibly engage with the plurality of apertures 94 from inside the cylindrical side wall 96 and transmit torque from the drive disk 50 to the cylindrical cutting blade 90.

FIGS. 1-5 further show a quick release hole saw assembly, wherein the plurality of drive latches 60, 60a and 60b comprise levers pivotally mounted on a pivot point to the drive disk 50. The pivot point is a small axle 53 that extends through an aperture 63 of each drive latch 60, 60a and 60b.

The figures further show that each lever 60, 60a and 60b comprises a second end 62 with a latch 62a configured to engage with a spring-actuated drive collar 40 disposed about the drive shaft 70, wherein the spring actuated drive collar 40 is biased to press the latch 62 and pivotally cause the projection 61 to engage with one of the plurality of apertures 94 inside the cylindrical side wall 96. Each lever 60, 60a and 60b is spring-actuated biased to pivotally cause the projection 61 to engage with one of the plurality of apertures 94 inside the cylindrical side wall 96.

Figure 6:
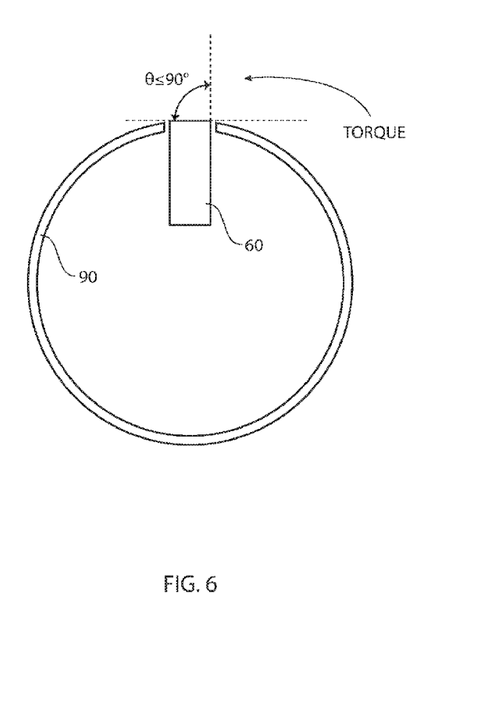
FIG. 6 is a top view of a drive latch engaged in an aperture in the cylindrical saw blade.
Figure 7:
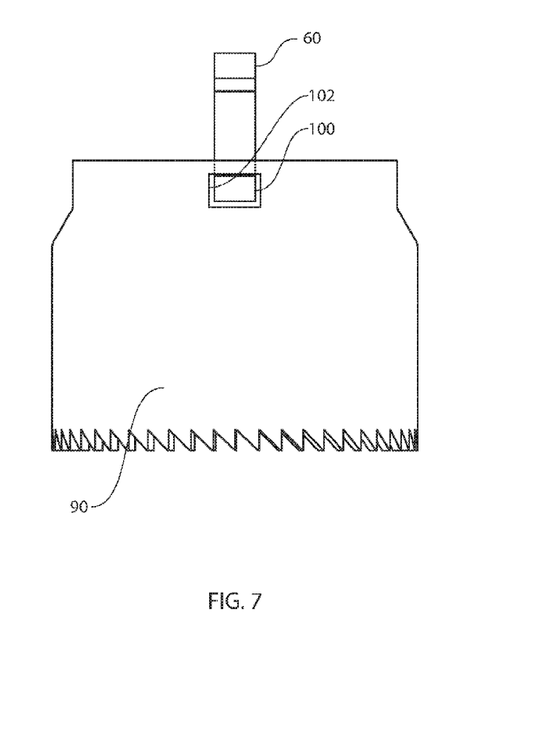
FIG. 7 is a side view of a drive latch engaged with an aperture in the cylindrical saw blade.

As shown in FIGS. 6 and 7, the plurality of apertures 94 have internal side walls 102 and the projections 61 have external side walls 100, wherein the internal side walls 102 of the plurality of apertures and external side walls 100 of the projections have an angle of 90 degrees or less such that when torque is applied to the cylindrical cutting blade by the drive disk the projections are maintained in engagement with the apertures.

Figure 2:
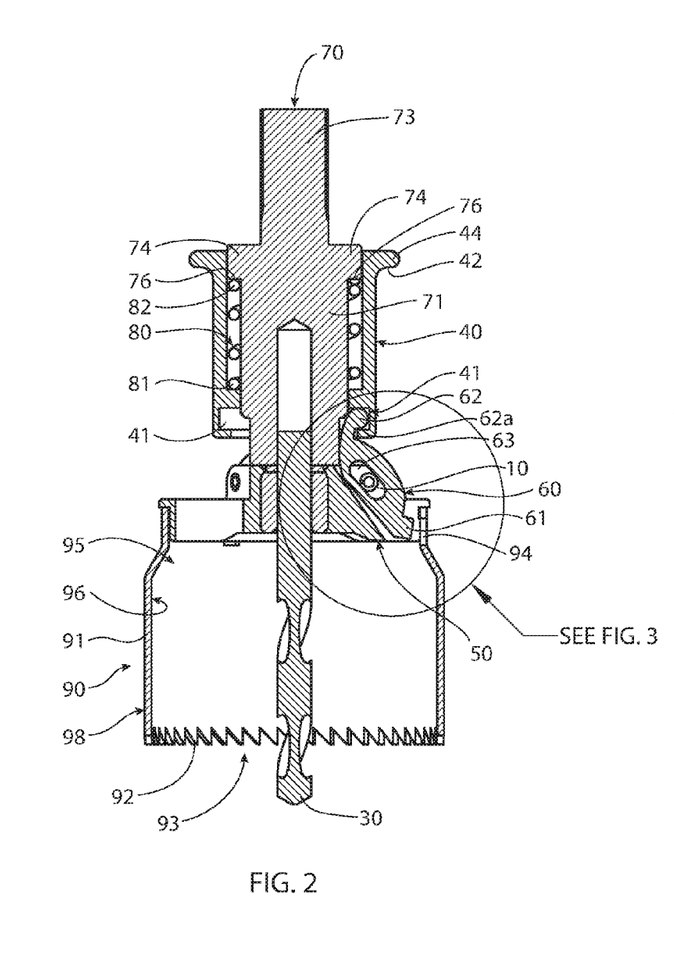
FIG. 2 is a side cutaway view of the hole saw assembly of FIG. 1, showing the hole saw blade engaged with the assembly.
Figure 5:
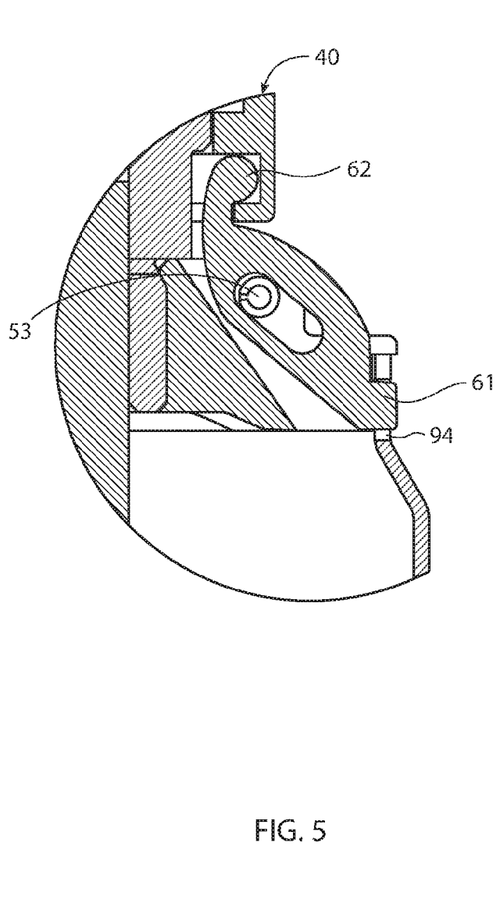
FIG. 5 is an enlarged section of FIG. 2.

FIGS. 2 and 3 show drive latch 60 pivoting radially inward within the channel 54 in the drive disk 50 when disengage with the plurality of apertures 94, thereby permitting release of the drive disk from the cylindrical cutting blade. FIGS. 4 and 5 show drive latch 60 pivoting radially outward and extending outside of the channel 54 in the drive disk 50 and engaging with the plurality of apertures 94, thereby engaging the drive disk with the cylindrical cutting blade. The channel 54 provides side support for the drive latches when torque is applied to the drive disk. FIGS. 2 and 3 further illustrate an embodiment in which the first end 61 of the plurality of drive latches 60, 60a and 60b pivots entirely into the channel 54.

As shown in FIGS. 2-5, the spring-actuated drive collar 40 has a channel 41 on the inside of the drive collar that engages a second end 62 of the drive latch, wherein axial movement of the drive collar about the drive shaft away from the drive disk causes the drive latch to pivot and the first end of the drive latch to disengage from the cylindrical cutting blade apertures, thereby releasing the cylindrical cutting blade from the drive disk. FIGS. 2, 3 and 4, 5 show different views where the cylindrical hole saw blade is engaged (FIGS. 2, 3) and disengaged (FIGS. 4, 5) from the drive disk 50.

In one embodiment, the mechanism by which the spring actuated drive collar causes the drive latches 60, 60a and 60b to pivot about pivot point of axle 53 is also illustrated in FIGS. 2-5. Spring 80 is positioned around the drive shaft 70, such that the proximal end 82 of the spring engages with the underside 76 of the rim 74 on the proximal end of the draft shaft 70. The spring-actuated drive collar 40 is then positioned about the drive shaft, such that the distal end 81 of spring 80 abuts the proximal end 44 of the drive collar 40. Drive collar 40 also includes a rim 42 which facilitates grasping the drive collar 40 and pulling it proximally toward the user to release the cylindrical hole saw blade 90 from the drive disk 50. The drive shaft 70 is positioned through the aperture 55 of the drive disk 50 and set screw 10 is screwed into a side hole (not shown) of the drive disk 50 to secure the drive disk on the drive shaft.

The cylindrical cutting blade 90 engages from drive disk 50 during use of the hole saw assembly in drilling a large diameter hole in an object. In order to facilitate engagement of the drive disk 50 with the cylindrical cutting blade 90, the drive disk 50 may have a rim 52 that extends wider than the internal diameter of the cylindrical cutting blade, but not wider than the external diameter of the cylindrical cutting blade. The drive disk 50 also has a recess relative to the outer diameter of the rim 52, that fits within the opening of cylindrical cutting blade 90. This configuration permits a close fit of the drive disk 50 with the cylindrical cutting blade 90.

As seem most easily in FIGS. 2 and 3, the drive latches 60, 60a and 60b have a second end 62 with a latch 62a which engages with an internal channel 41 of the spring-actuated drive collar 40. When the spring-actuated drive collar 40 is pulled upwardly (as shown in the drawing) toward the user, the latch 62a, which is engaged with the internal channel 41 of the drive collar 40 is pulled, causing the levers 60, 60a and 60b to pivot about the pivot point axles 53, which in turn causes the projections 61 to retract from the apertures 94.

Figure 8:
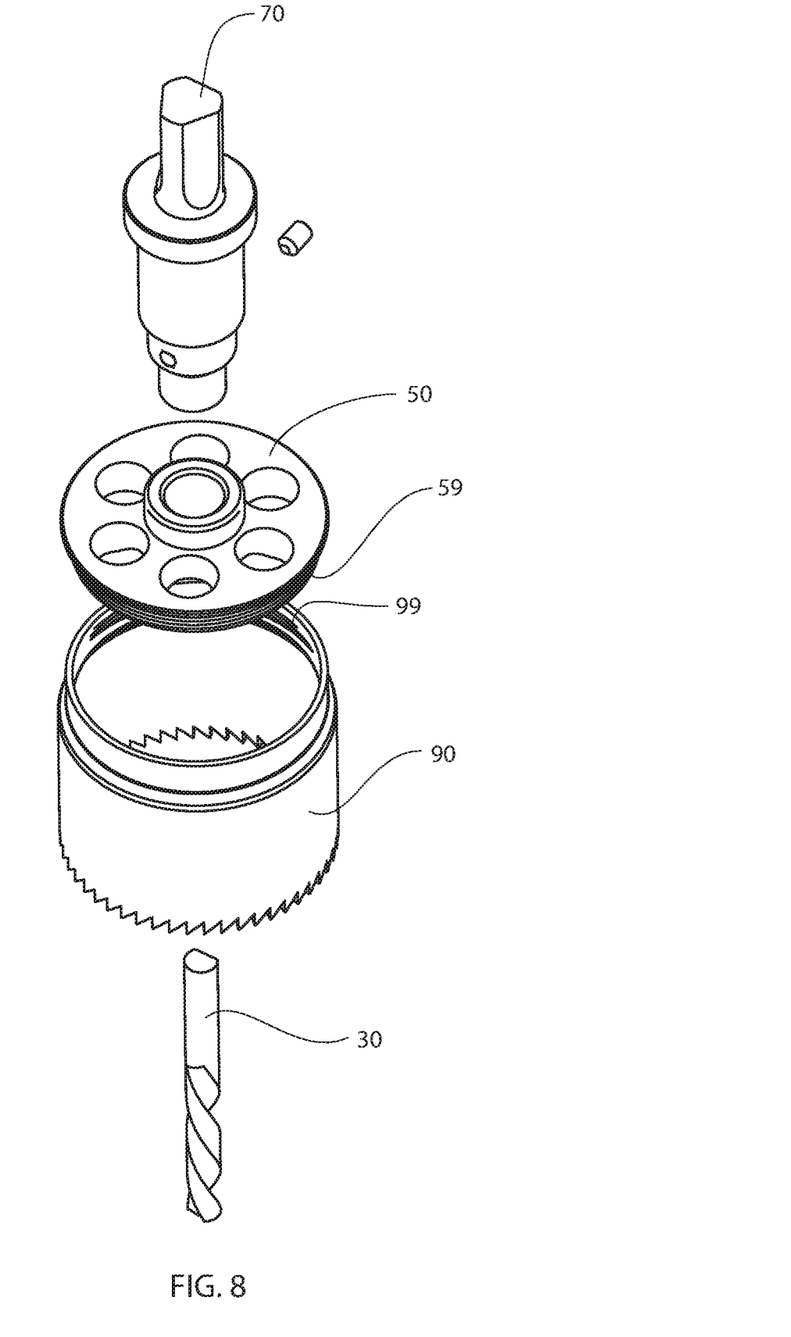
FIG. 8 is a perspective view of a hole saw having a threaded connection between a drive disk and a cylindrical saw blade.
Figure 9:
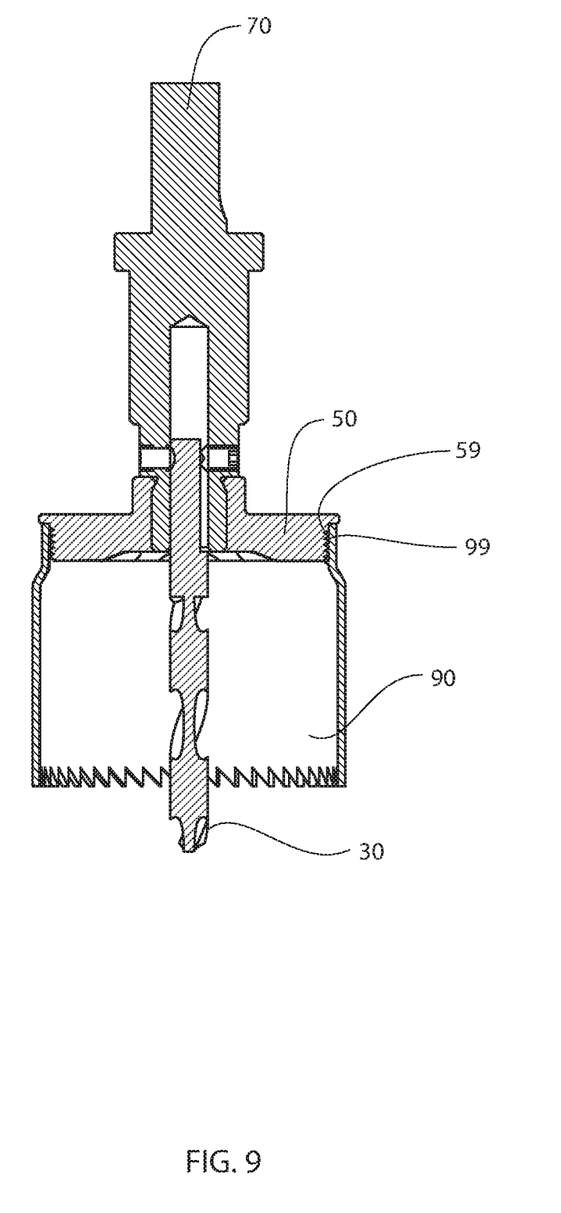
FIG. 9 is a side cutaway view of a hole saw having a threaded connection between a drive disk and a cylindrical saw blade.

Another specific embodiment is shown in FIGS. 8-9. FIG. 8 shows a perspective view of a hole saw having a threaded connection between a drive disk and a cylindrical saw blade. The arbor shaft 70 connect to drive disk 50, which has threads 59 that are configured to mate and thread with threads 99 of the cylindrical hole saw blade 90. FIG. 9 shows a side cutaway view of a hole saw having a threaded connection between a drive disk and a cylindrical saw blade, with threads 59 and threads 99 engaged to connect the drive disk and cylindrical saw blade.

Figure 10:
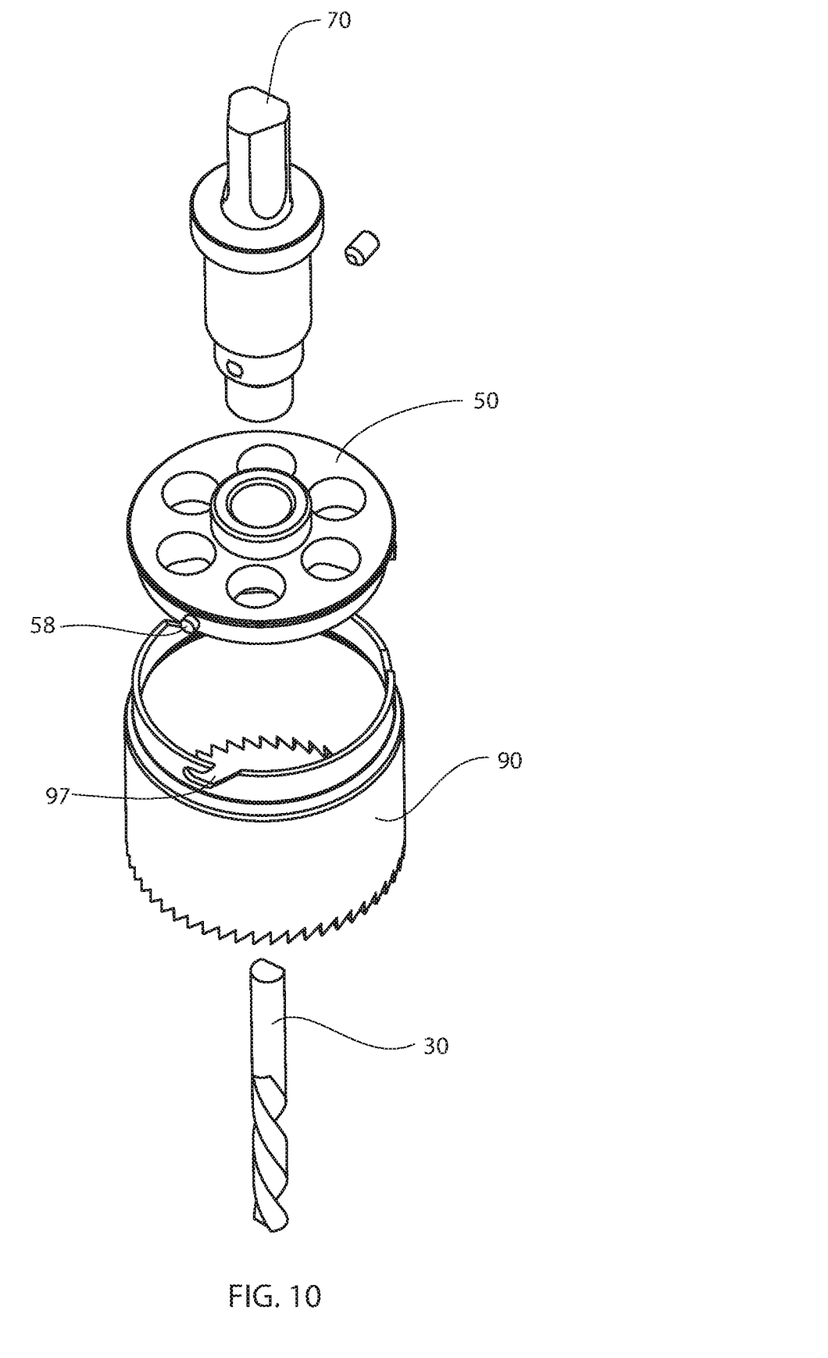
FIG. 10 is a perspective view of a hole saw having a pin and pin slot connection between a drive disk and a cylindrical saw blade.
Figure 11:
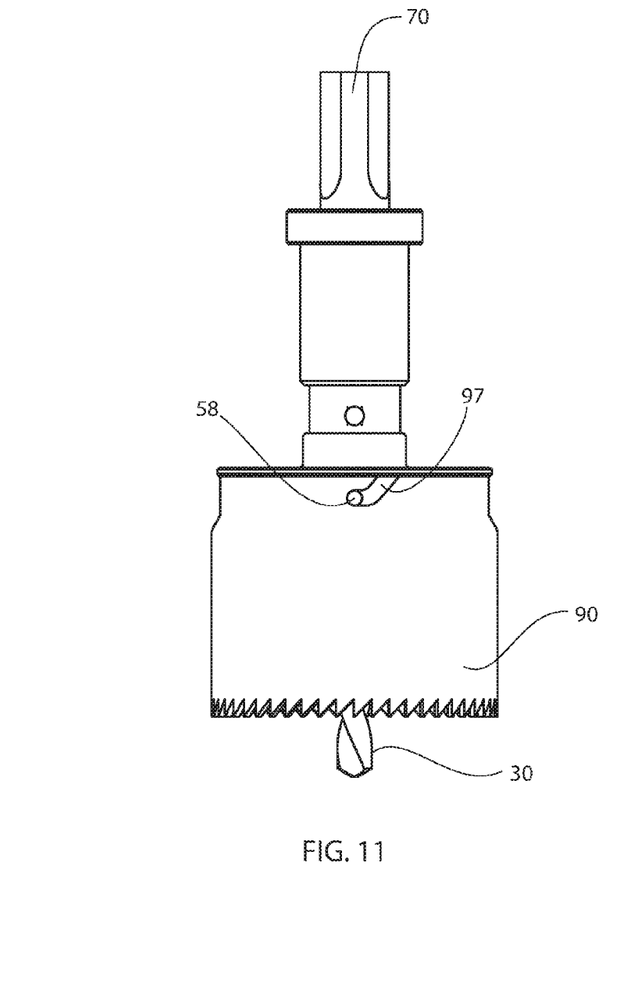
FIG. 11 is a side view of a hole saw having a pin and pin slot connection between a drive disk and a cylindrical saw blade.
Figure 12:
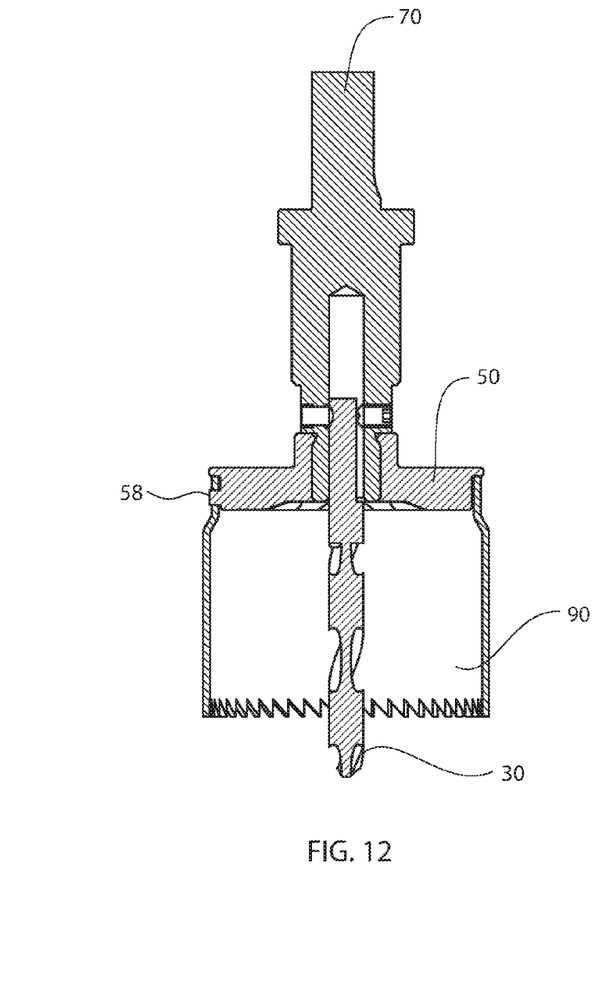
FIG. 12 is a side cutaway view of a hole saw having a pin and pin slot connection between a drive disk and a cylindrical saw blade.

FIGS. 10-12 show an alternative embodiment in which the drive disk 50 has a fixed pin 58 disposed on the radial side of the drive disk. The fixed pin 58 is configured to slide into a pin slot 97 in the drive disk 90. As shown most clearly in FIGS. 10 and 11, the pin slot 97 comprises a slot that is first angled from the proximal edge of the cylindrical saw blade and then angles horizontal generally parallel to the proximal edge of the cylindrical saw blade. The generally parallel portion of the pin slot 97 may be slightly off-parallel to the proximal edge so that when the fixed pin 58 is inserted into the pin slot and slid along the path defined by the generally parallel portion, the fixed pin engages with the side of the pin slot so as to tighten the drive disk onto the cylindrical saw blade sufficient to retain the saw blade on the drive disk.

There is thus disclosed an improved hole saw tool. It will be appreciated that numerous changes may be made to the present invention without departing from the scope of the claims. It is understood that one skilled in the art may conceive of other embodiments within the scope of the present invention, not expressly disclosed herein but which fall within the scope of the claimed invention, in which projections on a drive disk of a hole saw may mechanically project radially outwardly to engage with engagement slots in a cylindrical saw blade. It is understood that the specific embodiments disclosed herein are not limiting of the scope of the invention, and that other embodiments not specifically disclosed herein may fall within the scope of the claims.

The invention claimed is:

1. A quick release hole saw assembly, comprising:
   a cylindrical cutting blade consisting essentially of a cylindrical side wall having a fully open distal end having a cutting edge and a fully open proximal end having a plurality of engagement slots in the cylindrical side wall;
   a drive shaft configured to receive a guide drill;
   a drive disk non-rotateably connected to the drive shaft and configured to mate with the proximal end of the cylindrical side wall of the cylindrical cutting blade by way of a plurality of drive latches that are pivotally mounted about pivot pins disposed between side supports;
   a plurality of projections extending from the drive latches, wherein the projections extend radially outward from the drive disk and reversibly engage with the plurality of engagement slots in the cylindrical side wall to lock the projections axially and radially into place into the engagement slots of the cylindrical cutting blade and transmit torque from the drive disk to the cylindrical cutting blade; and
   wherein the side supports support and engage the drive latches while transmitting torque from the disk drive to the cylindrical cutting blade.

2. The quick release hole saw assembly of claim 1, wherein the drive latches are configured to slideably and reversibly extend radially from the drive disk and engage with the engagement slots in the cylindrical side wall of the cylindrical cutting blade.

3. The quick release hole saw assembly of claim 1, wherein each drive latch further comprises a second end with a latch configured to engage with a spring-actuated drive collar disposed about the drive shaft, wherein the spring actuated drive collar is biased to press the latch distally forward and pivotally cause the drive latch to engage with one of the plurality of engagement slots inside the cylindrical side wall.

4. The quick release hole saw assembly of claim 1, wherein the drive latches each comprise an elongate pivot hole.

5. The quick release hole saw assembly of claim 4, wherein the elongate pivot holes are at an angle such that when the second end of the drive latches move in a proximal direction the first end of the drive latch move radially inwardly and in a proximal direction.

6. The quick release hole saw assembly of claim 1, wherein each drive latch is spring-actuated biased to pivotally cause the projection to engage with one of the plurality of engagement slots inside the cylindrical side wall.

7. A quick release hole saw assembly, comprising:
a cylindrical cutting blade consisting essentially of a cylindrical side wall having a fully open distal end having a cutting edge and a fully open proximal end having a plurality of engagement slots in the cylindrical side wall;
a drive shaft configured to receive a guide drill;
a drive disk non-rotateably connected to the drive shaft and configured to mate with the proximal end of the cylindrical side wall of the cylindrical cutting blade; and
a plurality of projections pivoting about pivot pins and attached to and extending radially outward from the drive disk and configured to reversibly engage with the plurality of engagement slots in the cylindrical side wall to transmit torque from the drive disk to the cylindrical cutting blade;
wherein the plurality of projections comprise drive latches configured to be pivotally mounted to a pivot point on the drive disk and to pivotally and reversibly extend radially from the drive disk and engage with the engagement slots in the cylindrical side wall;
wherein the plurality of engagement slots have internal side walls and the projections have external side walls, wherein the internal side walls of the plurality of engagement slots and external side walls of the projections have an angle of 90 degrees or less such that when torque is applied to the cylindrical cutting blade by the drive disk the projections are maintained in engagement with the engagement slots.

8. The quick release hole saw assembly of claim 7, wherein the internal side walls of the plurality of engagement slots and external side walls of the projections have an angle of less than 90 degrees.

9. The quick release hole saw assembly of claim 7, wherein the plurality of drive latches pivot into a radially extending channel in the drive disk when in engagement with the plurality of engagement slots, thereby providing side support for the drive latches when torque is applied to the drive disk.

10. The quick release hole saw assembly of claim 9, wherein the first end of the plurality of drive latches pivots entirely into the channel.

11. The quick release hole saw assembly of claim 7, wherein the drive disk has a circumference less than the circumference of the inner surface of the cylindrical cutting blade.

12. The quick release hole saw assembly of claim 7, wherein the fully open cylindrical cutting blade has no inwardly directed projections on the internal surface of the cutting blade that extend beyond the internal diameter of the cutting blade kerf.

13. The quick release hole saw assembly of claim 7, wherein the drive latches each comprise an elongate pivot hole.

14. The quick release hole saw assembly of claim 13, wherein the elongate pivot holes are at an angle such that when the second end of the drive latches move in a proximal direction the first end of the drive latch move radially inwardly and in a proximal direction.

15. A quick release hole saw assembly, comprising:
a cylindrical cutting blade consisting essentially of a cylindrical side wall having a fully open distal end having a cutting edge and a fully open proximal end having a plurality of engagement slots in the cylindrical side wall;
a drive shaft configured to receive a guide drill;
a drive disk non-rotateably connected to the drive shaft and configured to mate with the proximal end of the cylindrical side wall of the cylindrical cutting blade; and
a plurality of projections pivoting about pivot pins and attached to and extending radially outward from the drive disk and configured to reversibly engage with the plurality of engagement slots in the cylindrical side wall to transmit torque from the drive disk to the cylindrical cutting blade;
wherein the plurality of projections comprise drive latches configured to be pivotally mounted to a pivot point on the drive disk and to pivotally and reversibly extend radially from the drive disk and engage with the engagement slots in the cylindrical side wall;
wherein each drive latch further comprises a second end with a latch configured to engage with a spring-actuated drive collar disposed about the drive shaft, wherein the spring actuated drive collar is biased to press the latch distally forward and pivotally cause the drive latch to engage with one of the plurality of engagement slots inside the cylindrical side wall;
wherein the spring-actuated drive collar has a channel inside the drive collar that engages a second end of the drive latch, wherein axial movement of the drive collar about the drive shaft away from the drive disk causes the drive latch to pivot and the first end of the drive latch to disengage from the cylindrical cutting blade apertures, thereby releasing the cylindrical cutting blade from the drive disk.

16. The quick release hole saw assembly of claim 15, wherein the drive latches each comprise an elongate pivot hole.

17. The quick release hole saw assembly of claim 16, wherein the elongate pivot holes are at an angle such that when the second end of the drive latches move in a proximal direction the first end of the drive latch move radially inwardly and in a proximal direction.

* * * * *